Feb. 6, 1940. R. BURR 2,189,240
OVEN RACK
Filed Feb. 27, 1939 2 Sheets-Sheet 1
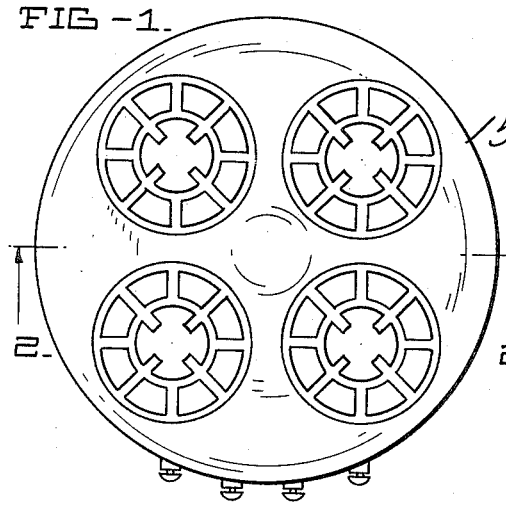
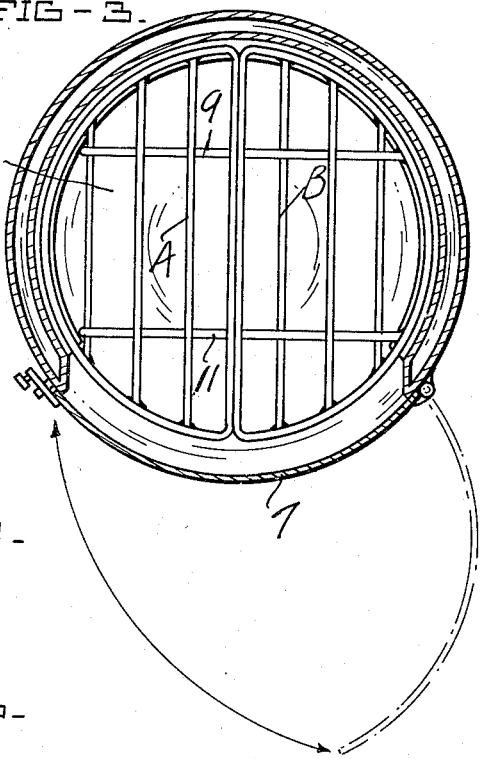
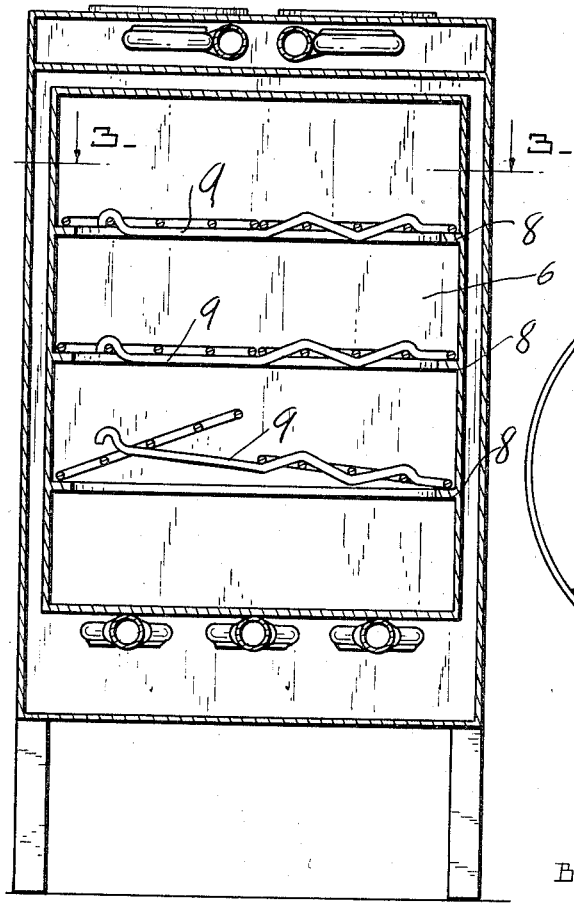
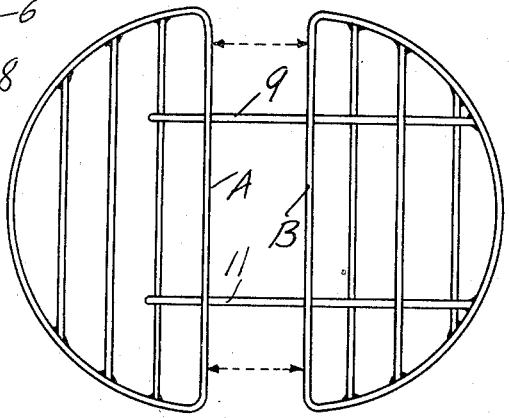
INVENTOR
RAYMOND BURR
BY Victor J Evans & Co
ATTORNEYS Feb. 6, 1940. R. BURR 2,189,240
OVEN RACK
Filed Feb. 27, 1939 2 Sheets-Sheet 2
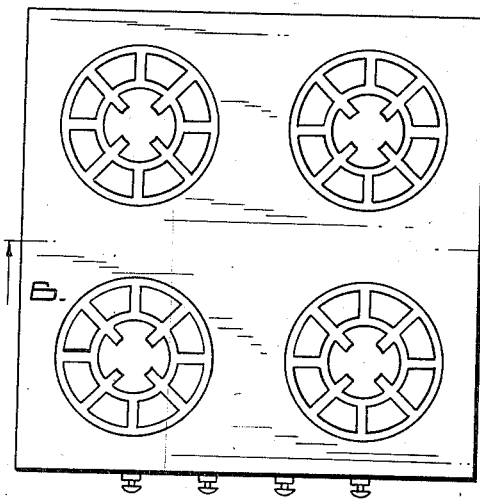
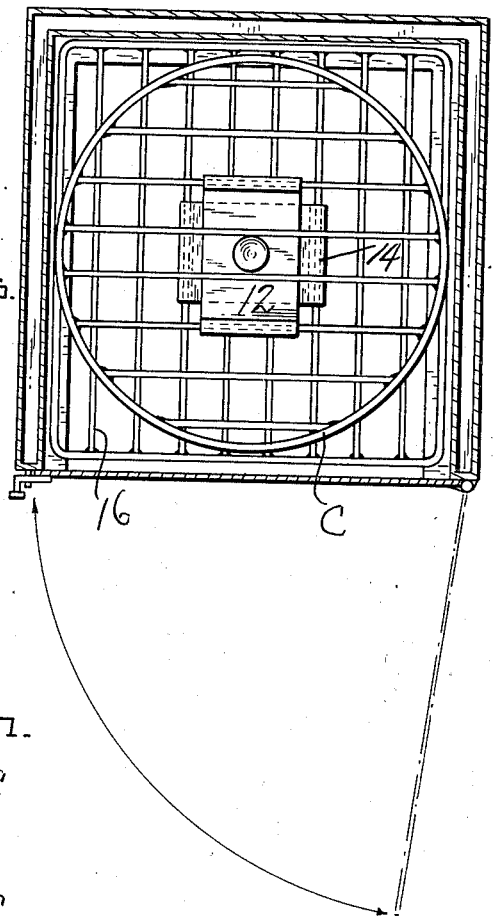
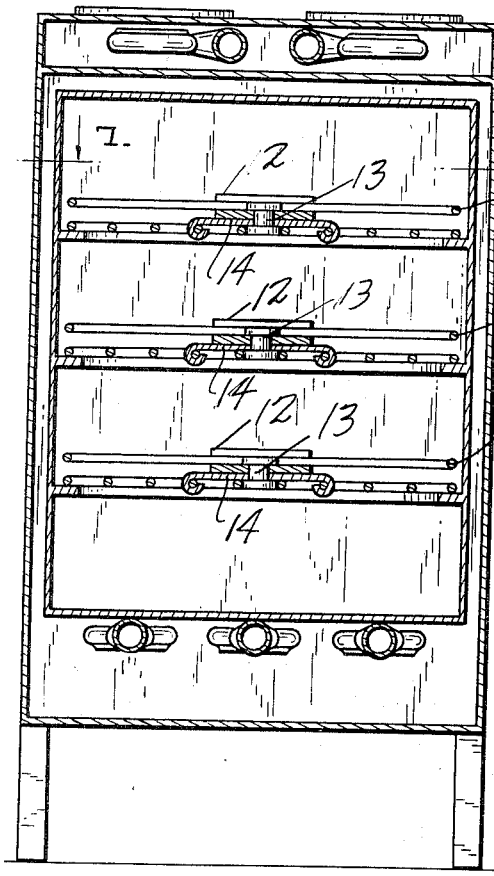
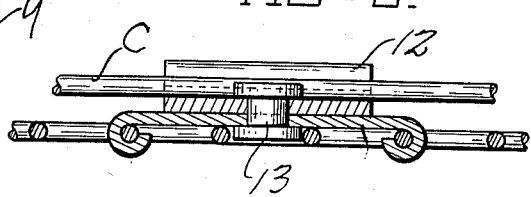
INVENTOR
RAYMOND BURR
BY *Victor J. Evans & Co*
ATTORNEYS Patented Feb. 6, 1940

2,189,240

UNITED STATES PATENT OFFICE 2,189,240

OVEN RACK

Raymond Burr, South Pasadena, Calif.

Application February 27, 1939, Serial No. 258,834

3 Claims. (Cl. 126—338)

This invention relates to improvements in oven racks and has particular reference to an oven rack particularly adaptable to a cylindrical oven.

A further object is to produce a rack wherein the same may be rotated to facilitate the placing or withdrawing of articles from the oven without having to reach to the back of the oven.

Other objects and advantages will be apparent during the course of the following description.

In the accompanying drawings forming a part of this specification and in which like numerals are employed to designate like parts throughout the same, Fig. 1 is a top plan view of a cylindrical stove;

Fig. 2 is a vertical cross sectional view taken on the line 2—2 of Fig. 1;

Fig. 3 is a cross sectional view taken on the line 3—3 of Fig. 2;

Fig. 4 is a top plan view of one of the racks removed and in expanded position;

Fig. 5 is a top plan view of a square stove;

Fig. 6 is a cross sectional view taken on the line 6—6 of Fig. 5;

Fig. 7 is a cross sectional view taken on the line 7—7 of Fig. 6; and

Fig. 8 is a view illustrating the manner of supporting the rack whereby the same may be rotated when employed in a square type of stove.

It is a well-known fact that more even heat is accomplished in a cylindrical type of stove than in a square type, and it is apparent that in a cylindrical stove the door should necessarily be as narrow as convenient for use. However, this arrangement prevents the removal of full-sized racks. Also, it is apparent that articles in the back of the oven could not be removed until articles in the front have been removed.

I have, therefore, devised a rack which may be placed in the oven and rotated through 360° to bring the articles in the back of the oven to the front. At the same time, I have produced a rack which may be removed from a circular oven.

In the accompanying drawings wherein for the purpose of illustration is shown a preferred embodiment of my invention, the numeral 5 designates a stove as a whole having an oven space 6 and a door 7. Within the oven space I provide ledges 8 upon which the racks rest when in the position of Fig. 3.

My rack consists preferably of two sections A and B, secured together by hooked arms 9 and 11, secured to the section B and extending under section A and hooking over certain of the cross wires therein. When the two sections are expanded, as shown in Fig. 4, the rack may be used as a rest outside of the stove, and when the parts are in the position of Fig. 2, the rack will just fit the contour of the stove. By lifting the two sections, as shown in Fig. 2, it will be apparent that the rack may be caused to assume a width less than the width of the door and may, therefore, be removable through the door. Also, when the racks are in the full line position, it will be apparent that they may be rotated through 360° above referred to.

In the modified forms shown in Figs. 5, 6, and 7, I employ the same round rack as shown at C, which rests upon a metal plate 12, which plate has a center pin 13 which is secured to a plate 14 mounted upon the square rack 16.

It will be noted that in Figs. 1 and 5, I have shown four burners and the width of a stove to accommodate the four burners. The width of the stove might, however, be readily increased so that a steamer pan could be employed, which steamer pan would serve the purpose of keeping the food warm after it has been cooked. The lid, of course, would be utilized to cover the steam pan.

It will thus be seen that with my device it is possible to accomplish the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. An oven rack comprising two separate semi-circular sections, the straight edge of one section having rods extending therefrom and adapted to interlock with the second section and to be adjusted by a tilting movement of the two sections.

2. An oven rack comprising two separate semi-circular sections formed with bars parallel to the straight edges thereof, and transverse bars carried by one section adapted to extend under the straight edge of the second section, and having hooked ends adapted to hook over any of the bars of the said second section and to be adjusted by a tilting movement of the two sections.

3. The combination with an oven, a circular rack supported therein for rotation, said rack composed of two separate semi-circular sections and each section formed with bars parallel the straight edges thereof, and transverse bars carried by one section adapted to extend under the straight edge of the second section and having hooked ends adapted to hook over any of the bars of the said second section and to be adjusted by a tilting movement of the two sections.

RAYMOND BURR.